UNITED STATES PATENT OFFICE.

G. H. MELLEN AND J. C. HAZLETON, OF WASHINGTON, D. C.

IMPROVED BURNING-FLUID.

Specification forming part of Letters Patent No. 57,749, dated September 4, 1866.

*To all whom it may concern:*

Be it known that we, G. H. MELLEN and JOHN C. HAZLETON, of the city and county of Washington, in the District of Columbia, have invented a new and Improved Illuminating-Oil; and we do hereby declare that the following is a full and exact description thereof.

The nature of our invention consists in combining certain ingredients in certain proportions, the first or most important one having first undergone a preliminary or purifying process.

To enable others skilled in the art to make and use our invention, we will proceed to describe it.

We take of naphtha, (65°,) forty gallons; carbonate of soda, three pounds; oil of sassafras, four ounces; alum, two pounds; gum-camphor, one-half pound; ground slippery-elm, two pounds; hydrate of lime, two pounds; essence of tar, one ounce.

Before using the naphtha we filter it through a bushel of granulated charcoal and four quarts of hydrate of lime. This being done, we take the filtered naphtha and put in it all the above-named ingredients, which, after being dissolved as far as possible, the liquid or oil can be drawn off, and which we propose calling "Vestaline" oil or fluid.

Having thus described our invention, what we claim as new, and desire to secure by Letters Patent of the United States, is—

An illuminating-oil composed of the several ingredients named and of the proportions substantially as set forth.

GEO. H. MELLEN.
      JNO. C. HAZLETON.

Witnesses:
 S. S. FAHNESTOCK,
 THEODORE LANG.